United States Patent
Yamada et al.

(12) 
(10) Patent No.: US 6,297,445 B1
(45) Date of Patent: Oct. 2, 2001

(54) COMMUNICATION LINE

(75) Inventors: Naoshi Yamada; Yoshiharu Unami, both of Tokyo (JP)

(73) Assignee: Fujikura, LTD, Tokyo (JP)

( * ) Notice: Subject to any disclaimer, the term of this patent is extended or adjusted under 35 U.S.C. 154(b) by 0 days.

(21) Appl. No.: 09/237,682

(22) Filed: Jan. 27, 1999

(30) Foreign Application Priority Data

Feb. 10, 1998 (JP) .................................... 10-028833

(51) Int. Cl.$^7$ ............................ H01B 11/02; H01B 11/06

(52) U.S. Cl. .................... 174/33; 174/36; 174/34

(58) Field of Search ................................ 174/33, 34, 32, 174/36, 110 R

(56) References Cited

U.S. PATENT DOCUMENTS

| | | | | |
|---|---|---|---|---|
| 3,735,056 | * | 5/1973 | Martin et al. | 179/170 E |
| 4,510,600 | * | 4/1985 | Tan | 370/94 |
| 5,064,966 | * | 11/1991 | Palmer | 174/32 |
| 5,960,005 | * | 9/1999 | Moteki et al. | 370/496 |
| 5,986,207 | * | 11/1999 | Uhiehuth | 174/33 |

* cited by examiner

*Primary Examiner*—Dean A. Reichard
*Assistant Examiner*—William H Mayo, III
(74) *Attorney, Agent, or Firm*—Burns Doane Swecker & Mathis

(57) ABSTRACT

A communication line is disclosed which is able to reduce the difference in the signal propagation time between the wires of the twisted pair. A communication line of the present invention is achieved by cutting and exchanging a pair of wires at the middle point or plural points in the line, so that the positive connecting parts and the negative connecting parts formed by the above cutting and exchanging are equal in length.

4 Claims, 4 Drawing Sheets

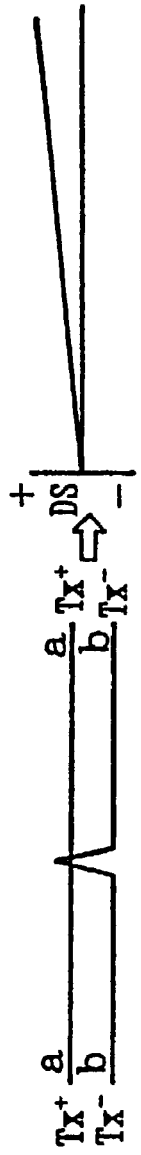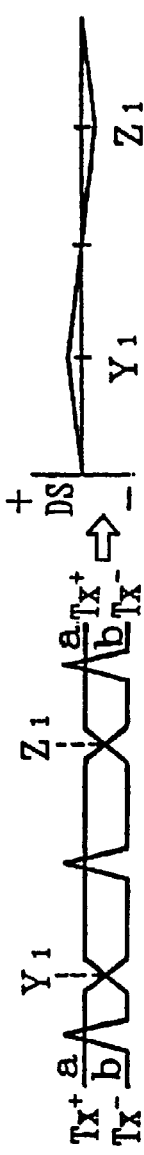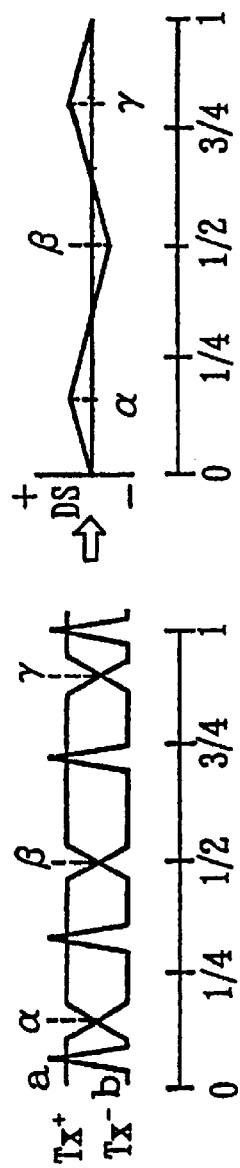

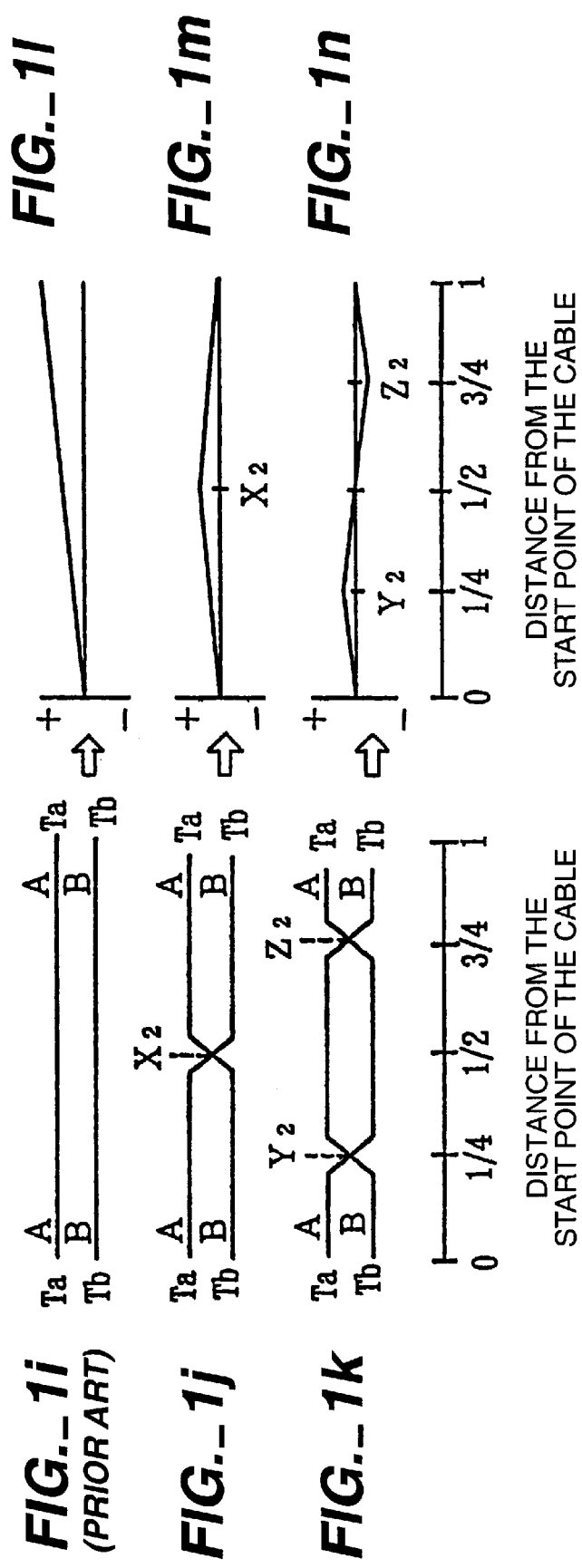

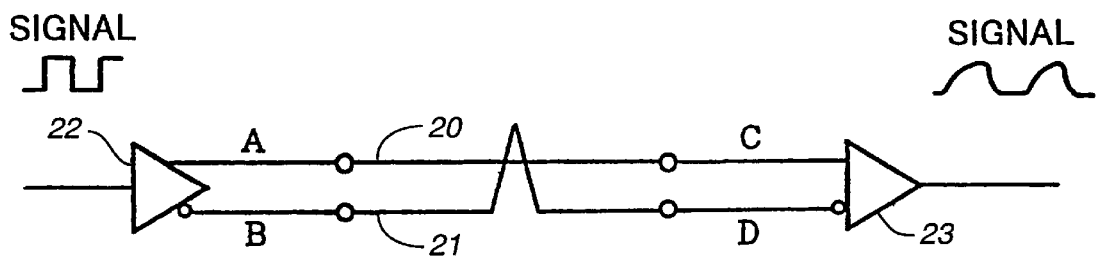
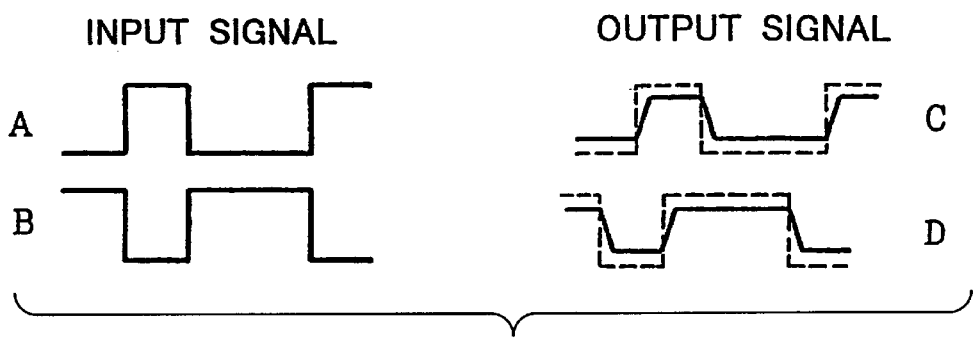
FIG._2
*(PRIOR ART)*
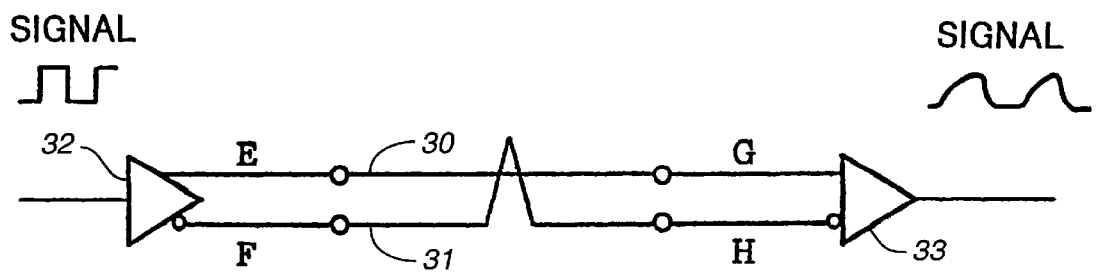
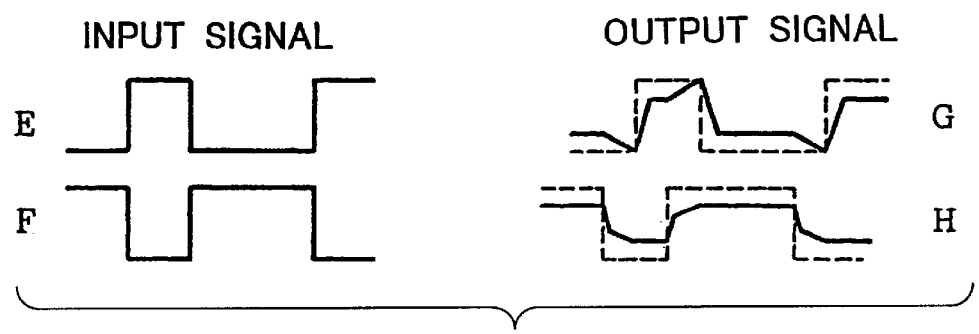
FIG._3
*(PRIOR ART)*

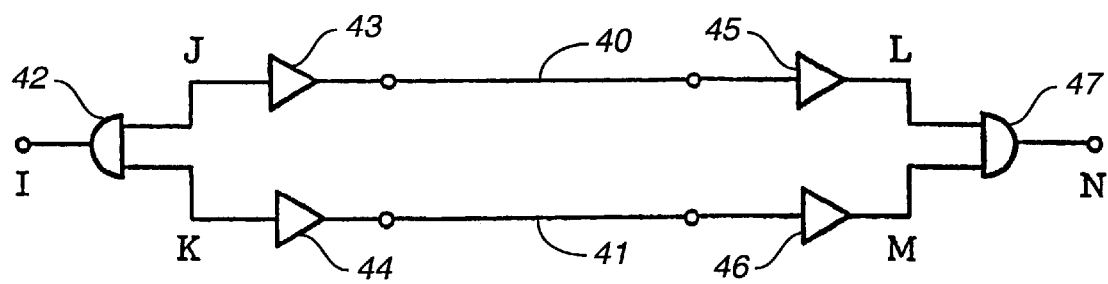
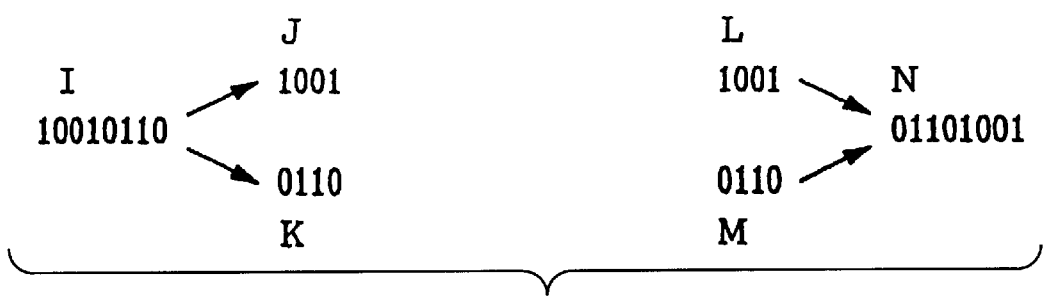
FIG._4
*(PRIOR ART)*

COMMUNICATION LINE

BACKGROUND OF THE INVENTION

1. Field of the Invention

The present invention relates to a communication line composed by one or more signal transmission element, where each element is swapped with another wire at one or more points of its line.

This application is based on patent application No.Hei 10-028833 filed in Japan, the content of which is incorporated herein by reference.

2. Description of Related Art

A pair of conventional signal lines generally comprises a pair of twisted wires made by twisting two conductors in order to prevent noise and crosstalk by the mutual interference of the pair of wires. There is the problem in the transmission of the two differential signals with the conventional twisted wires in that the two differential signals have a relative phase shift caused by the delay of signals.

The insulators used as covers for each of the twisted wires have respectively different physical characteristics since they are manufactured with the mixture of the various dyes and pigments, and also they have respectively different dielectric constants as they have different foaming degrees and they have twisted deformations. Consequently, there is a difference in the signal propagation times between the two twisted wires, which is called a differential skew.

In the process of manufacturing the two twisted wires, the tensions added to the two wires are sometimes unequal. In these cases, one wire to which is added stronger tension is twisted shorter than the other wire to which is added the weaker tension, and there is a result that the two wires to be twisted have different lengths.

Also, as an example of the parallel transmission of more than two independent signals, the parallel transmission of the four signals using the UTP (Un-shielded Twisted Pair) cable (specifically 4 pairs of twisted wires) which is currently used in the field of LANs (Local Area Network) is discussed below. This UTP cable is generally intended to give each pair of its wires a different twisting pitch in order to decrease the crosstalk. By this and the above reasons, because of the different conductors and different tensions, four pairs of wires have respectively a different length, and consequently have different propagation times for the four signals from the input terminal to the output terminal of the UTP cable.

The more detailed problem relating to the twisted wires will be discussed below in the two cases: differential transmission and parallel transmission.

(1) Differential Transmission

The differential skew, which occurres during manufacturing, is accumulated almost constantly toward the longitudinal direction of the wire. The increasing ratio of the accumulation depends on the respective manufacturing apparatus. This differential skew causes a distortion of the signal waveform, and the influences are described below in the two sections (1-a) and (1-b).

(1-a) Influence by the Phase Shift at the Output Terminal

In FIG. 2, a signal is separated into differential signals A and B by the differential amplifier 22, and the signals A and B are transmitted through the conductors 20 and 21 which are respectively insulated, and output signals C and D are gathered together into one signal by the differential amplifier 23. Signals A and B are transmitted through the channel which is made between the conductors 20 and 21, and the insulator of the cable or the earth. In the case shown in FIG. 2, the conductor 20 through which the signal A propagates has a longer propagation delay than the conductor 21 through which the signal B propagates. Consequently, the output signal C has a phase delay in comparison with the signal D. When the phase delay becomes bigger than the time of 1 bit of the original signal, the receiver circuit can not receive the signal correctly and it results a bit error. In FIG. 2, the pulse of the conductor 21 in the middle of the line shows that the conductor 20 and 21 are twisted.

(1-b) Influence of the Waveform Distortion by the Electromagnetic Induction

In FIG. 3, signals E and F which passed the differential amplifier 32 are transmitted through the conductors 30 and 31, and output signals G and H are gathered together into one signal by the differential amplifier 33. Here, it is supposed that the conductor 30 in which the signal E propagates has a bigger propagation delay than the conductor 31 in which the signal F runs.

In FIG. 3, a phenomenon caused by the differential skew is arisen wherein a signal with an early phase is decreased its amplitude, and a signal with a late phase is increased its amplitude. This is because of the electromagnetic induction by the phase shift of the differential waveform which is transmitted in the conductor. Additionally, if the phase shift increases, the distortion increases; and if the phase is inverted, the distortion in decreased. Accordingly, when the length of the line which has an early phase and that which has a late phase are not balanced, the output waveform is unbalanced and loses its differential voltage symmetry because the distortion of the waveform is not compensated to the end of the line. This distortion of the waveform also increases not only the decrease of the amplitude but also the jitters.

The degradation of the waveform makes it difficult to recognize the signal correctly at the receiving circuit, and it also causes bit errors and prevents high speed and long distance communication.

As an example of the requirement for the difference in the propagation delay time of the twisted wires, 1000 Base-CX being discussed in IEEE P802.3z provides a difference of propagation delay time less than 150 ps. This means that the allowance of generally used twisted wires is approximately 4 cm. This accuracy is actually impossible to realize.

(2) Parallel Transmission

An example of the parallel transmission with twisted wires will be discussed below. In FIG. 4, the data is transmitted in parallel with two pairs of twisted wires. Here, serial signal I is divided into two parallel signals J and K by serial-parallel converter 42, and signals J and K are transmitted from transmission circuit 43 and 44 through two pairs of twisted wires 40 and 41 to the receiving circuit 45 and 46. After passing the receiving circuit 45 and 46, two parallel signals L and M are converted in to one serial signal N by parallel-serial converter 47. In this case, as two bit signals can be transmitted simultaneously, double the quantity of the data signals can be transmitted, compared to the single pair of twisted wire.

However, if there is a difference in the propagation delay time between each of the twisted wires, the sequence in the pair data is changed making it difficult to retrieve the data correctly. In FIG. 4, the propagation time through the twisted wires 40 is longer than that of the twisted wires 41. Accordingly, the signal through the twisted wires 40 is more delayed at the output end than the signal propagating through the twisted wires 41.

Therefore, conventional parallel transmission requires degrading the transmission speed or shortening the distance of the transmission within an allowable range of the propagation delay time between the twisted wires.

As a signal transmission element for parallel transmission, not only a balanced cable excluding the twisted wire but also an unbalanced cable such as a coaxial cable or an optical cable are satisfactory.

SUMMARY OF THE INVENTION

It is therefore an object of the present invention to provide a signal transmission element which is capable of differential transmission and parallel transmission with a long distance and a wide frequency range by decreasing the difference in the propagation delay time between the elements, with a simple construction of the receiving circuit and with an simplicity of manufacturing.

In order to attain this object, the present invention provides a communication line consisting of at least two signal transmission elements, further wherein said line has at least one connecting point at which at least one element is exchanged with another element, and positive connection parts and negative connection parts are produced.

With the signal transmission element of the present invention, it is possible to communicate over a long distance and over a wide frequency range by decreasing the difference in the propagation delay time between the twisted two wires. It is also possible to manufacture the signal transmission element of the present invention easily because it has a simple construction. In addition to the above reason, a communication system using the signal transmission element of the present invention requires neither a receiving circuit nor a complicated transmission circuit.

BRIEF DESCRIPTION OF THE DRAWINGS

FIG. 1 shows diagrams (a–d, i–k) of the signal transmission element and graphs (e–h, l–n) of the propagation delay time corresponding to the above diagrams according to the embodiments of the present invention.

FIG. 2 shows a diagram of the differential transmission line and graphs of the input/output signals explaining the phase shift.

FIG. 3 shows a diagram of the differential transmission line and graphs of the input/output signals explaining the waveform distortion by the electromagnetic induction.

FIG. 4 shows a diagram of the parallel transmission line and the relation of the input signals and output signals.

DESCRIPTION OF PREFERRED EMBODIMENTS

Hereinbelow, communication lines according to the embodiments of the present invention will be described with reference to FIG. 1 which includes diagrams (a–d, i–k) of the signal transmission element and graphs (e–h, l–n) of the propagation delay time corresponding to the above diagrams.

1. Differential Communication

First, the embodiments of differential communication are discussed using FIGS. 1(a–d, e–h). FIG. 1(a) is a diagram of conventional twisted wires, and FIG. 1(b) is a diagram of the twisted wires according to the first embodiment of the present invention. In FIGS. 1(a)–(d), each element of the twisted pair is represented as element a and element b, and the pulse of a wire in the middle of the line shows that the two wires are twisted. Element b is supposed to be longer than element a in FIG. 1(a) because they are twisted. Also, element a and element b are supposed to be used for the transmissions of differential signals Tx+ and Tx−, respectively. Tx+ represents its voltage between the element a and insulator of the cable of the element, or the earth. Tx− represents the same between the element b and insulator of the cable of the element, or the earth alike.

In FIG. 1(b), two elements of the twisted pair are cut and exchanged at the point X1 in the middle of the line, resulting in a positive connecting portion and inverse connecting portion. Here, the positive connecting portion is defined as a portion on which the differential signal Tx+ is transmitted. On the other hand, the inverse connecting portion is defined as a portion on which the differential signal Tx− is transmitted. Before the point X1 (left side of the point X1), element b is longer than element a, accordingly the signal Tx− propagates a longer distance than the signal Tx+ does. However, the first embodiment of the present invention enables both signals of Tx+ and Tx− to propagates the same distances, as shown in FIG. 1(b), because the first half of the element a is connected with the second half of the element b at the point X1, and the first half of the element b is connected with the second half of the element a at the same point X1.

When the signal Tx+ is input at the input terminal of the element a and the signal Tx− is input at the input terminal of the wire b, the signals Tx+ and Tx− each run the same distance to the output terminal. In other words, the signal Tx+ which propagated on the element a in the first half propagates on the element b in the second half, after passing the point X1. Similarly, the signal Tx− which ran on the element b in the first half runs on the element a in the second half, after passing the point X1. Even if there are differences of length or of the propagation speed of the element a and element b produced at the manufacturing, the re-connection of the element at the point X1 enables cancellation of the difference of the distance of the wires. Consequently, the propagation times of the signal Tx+ and Tx− are the same at the output terminal, and the waveforms of the signals observed at the output terminal have no phase shift.

Furthermore, accumulation of the differential skew for the two-conductor twisted wires will be explained. In the conventional case of the FIG. 1(a), the differential skew increases linearly in proportion to the length from the input terminal (left) of the element as shown in FIG. 1(e). Because the signal Tx+ has an advanced phase compared to the signal Tx−, and the difference of the phases of the signal Tx+ and the signal Tx− increases linearly.

In contrast, in the first embodiment of the present invention shown in FIG. 1(b), the differential skew increases linearly from the start point (left) to the point X1, and then decreases linearly from the point X1 to the end point (right) in same ratio as when increasing, as shown in FIG. 1(f). The differential skew increases and decreases identically, and the difference in the increase and decrease is cancelled at the end point.

Next, FIG. 1(c) shows a diagram of the twisted wires according to the second embodiment of the present invention, which has two connecting points: point Y1 on the first quarter of the line and point Z1 on the third quarter of the line, supposing that the signal proceeds from left to right in FIG. 1(c). The wires are switched twice at the points Y1 and Z1 The accumulation of the differential skew in this case is shown in FIG. 1(g). In FIG. 1(g), the differential skew increases linearly before the point Y1, decreases toward the point Z1 with a same ratio as the increase, and then increases with a same ratio as above to the end point; finally the differential skew is cancelled at the end point. Adding to this, as the length of the line when the differential skew is positive (the signal Tx+ is ahead to the signal Tx−) and the length of the line when the differential skew is negative (the signal Tx− is ahead to the signal Tx+) are equal, the waveform distortion by the electromagnetic induction is cancelled or minimized at the end point of the line. Consequently, the total phase distortion is expected to be minimized.

FIG. 1(d) shows a diagram of the twisted wires according to the third embodiment of the present invention, and FIG. 1(h) shows an accumulation of the differential skew by this embodiment. The FIGS. 1(d) and (h) are drawn in proportion to the actual length of the line. In detail, the differential skew is constant throughout the wires, and it increases in proportion to the length of the line. Assuming that the value of the differential skew is c per unit length, a line with a gradient of c can be drawn from the start point (left end) in FIG. 1(h). The connecting points in the line where the twisted wires are to be switched are denoted α,β and γ. As the wires are switched at the point α in FIG. 1(d), the gradient of differential skew per unit length turns to be −c, and the line can be drawn with a gradient of −c. The line continues to be drawn through the points β and γ and then to the end point (right end in FIG. 1(h)). FIG. 1(d) and FIG. 1(h) refer to the example of three connecting points of α,β, γ.

Consequently, the total communication line is divided into more than two parts comprising positive differential skew (positive phase part) and negative differential skew (negative phase part). The numbers of connection points can be decided and their positions adjusted so that the amount of each of the positive phase parts and each of negative phase parts are equal.

By the embodiment described above, the waveform distortion by the electromagnetic induction is expected to be minimized as the amount of the positive phase parts and the amount negative phase parts are equal. The total waveform distortion can be minimized as the waveform distortion by the electromagnetic induction is minimized and the phase shift is cancelled at the end point of the communication line. It is obtained by deciding the numbers and positions of the connecting points of the wires so that the amount of the positive phase parts and the amount negative phase parts are equal. By this, the connecting points may be two or three such as points Y1, Z1 in FIG. 1(c, g) or α,β,γ in FIG. 1(d, h). Four connecting points are also possible which are at the positions of ⅛, ⅜, ⅝ and ⅞ in the communication line. Furthermore, five connecting points are possible, including the above four points plus a point of 4/8 in the communication line.

2. Parallel Communication

Next, the embodiments of parallel communication are discussed using FIGS. 1(i–k, l–n). FIG. 1(i) is a diagram of the conventional signal transmission elements, and FIG. 1(j) is a diagram of the signal transmission elements according to the fourth embodiment of the present invention. The two elements are represented as element A and element B, on which the signal Ta and the signal Tb runs respectively. In FIG. 1(i), the element B is supposed to be longer than the wire A.

In the fourth embodiment shown by FIG. 1(j), two elements are cut and exchanged once at the point X2, and positive connection part and negative connection part are formed. The positive connection part is a part where the signal A is transmitted on the element Ta and the signal B is transmitted on the element B, and the negative connection part is a part where the signal B is transmitted on the element Ta and the signal A is transmitted on the element Tb Before this element exchange, the signal Tb propagates farther than the signal Ta because the element B is longer than the element A. However, by the element exchange shown in FIG. 1 (j), the longer first half of the element A, which is from the start point (left end) to the point X2, is connected with the shorter second half of the element B. which is from the point X2 to the end point (right end). Similarly, the first half of the element B is connected with the second half of the element A at the point X2.

When the signal Ta and Tb are input at the input terminals of the element A and B respectively, each signal runs through half of each element A and B. That is to say, the signal Ta runs on the element A before the point X2, and runs on the element B after the point X1, and the signal Tb runs on the element B before the point X2, and runs on the element A after the point X1. The difference in the element length and the difference in the propagation time between the element A and the wire B are cancelled by this connection, the propagation times to the end terminal for the element A and the element B become equal, and the waveforms on the element A and the element B observed at the end terminal have no phase difference.

Further, the accumulation of the propagation delay time by the fourth embodiment will be explained. First, the difference of the propagation delay time of the conventional example increases in proportion to the element length shown in FIG. 1(l).

In contrast to the above conventional example, the difference in the propagation delay time increases in proportion to the element length from the start point to the point X2, but it decreases in inverse proportion to the element length from the point X2 to the end point of the elements, as shown in FIG. 1(m). Accordingly, the difference of the propagation delay time increases and decreases equivalently, and it is cancelled at the end point.

Next, the fifth embodiment of the present invention shown in FIG. 1(k). In FIG. 1(k), there are two connection points at the ¼ point in the line Y2 and at the ¾ point in the line Z2, and the elements are exchanged twice at these two points. FIG. 1(n) shows the accumulation of the difference of the propagation delay time corresponding to FIG. 1(k). In FIG. 1(n), the difference in the propagation delay time linearly increases to the point Y2, and from the point Y2 it decreases linearly with identical gradient to the point Z2, and then it increases again linearly with an identical gradient to the end point. Finally, the difference in the propagation delay time is cancelled.

Summing up, the difference of the propagation delay time can be minimized when the plurality of the signals are transmitted, by deciding the connecting point of the wires or transmission elements so that the amount of each the positive connections and each of the negative connections in the line are equal.

The communication wires required for the differential transmission of the present invention are not restricted to the twisted pair a balanced cable such as quad twisted wires can also to be used. Also, an unbalanced cable such as a coaxial cable and an optical cable adding to the above description can be applied to signal transmission elements required for parallel transmission of the present invention. Further, exchange at the plural points of the line enables the characteristics of the elements to be equal even if the characteristics of each element are not equal to the longitudinal direction. In differential transmission of the present invention, the waveform distortion by electromagnetic induction is cancelled at the end point of the line, by exchanging the wires at the plural points in the line so that the positive connecting part and the negative connecting part are equal in the amount of the lengths. Also, since the maximum of the differential skew is decreased in comparison to the original wires, the waveform is remarkably improved at the end point of the line and the differential signals with equilibrium can be transmitted.

As an another embodiment of the present invention which is not illustrated, there is a line which is cut and the wires exchanged at an even numbers of points and eventually the positive connections and the negative connections in the line have equal lengths- In this case, adding to the merits described above, reliable adjusting of the polarity of the wires is feasible as the input terminal and the output terminal have identically colored wires when the two wires are distinguished by colors.

Still further, adding to the connecting points where the wires or the elements are switched described above, the connecting points where the wires or the elements have not been switched are possible in the halfway of the line.

What is claimed is:

1. A communication line consisting of at least two signal transmission elements, wherein said line has at least one connecting point formed at half the length of the line at which at least one element of said signal transmission elements is exchanged with another element of said signal transmission elements, and positive connection parts and negative connection parts are produced.

2. A communication line according to claim 1 wherein at least two of said signal transmission elements are insulated wires, coaxial cables or optical fibers.

3. A communication line consisting of at least one pair of insulated wires, wherein said line has at least one connecting point formed at half the length of the line at which the polarity of at least one pair of said wires is exchanged, and positive connection parts and negative connection parts are produced.

4. A communication line consisting of at least one pair of insulated wires, wherein said line has one connecting point at the ½ of the length of the line at which the polarity of at least one pair of said wires is exchanged in order that the line is divided into one positive connection part and one negative connection part.

* * * * *